United States Patent [19]

Anwyll, Jr.

[11] Patent Number: 5,677,032
[45] Date of Patent: Oct. 14, 1997

[54] PERFORATED LAMINATE AND PROCESS FOR PREPARING SAME

[75] Inventor: James Anwyll, Jr., Ponte Veda Beach, Fla.

[73] Assignee: K2, Inc., Adrian, Mich.

[21] Appl. No.: 623,230

[22] Filed: Mar. 28, 1996

[51] Int. Cl.⁶ ............................. B32B 3/10; B32B 5/02
[52] U.S. Cl. .................. 428/137; 156/244.11; 156/252; 428/511; 442/219; 442/220; 442/290; 442/297; 442/319; 442/412
[58] Field of Search ............................. 428/43, 137, 511; 156/244.11, 252; 442/219, 220, 290, 295, 297, 398, 412

[56] References Cited

U.S. PATENT DOCUMENTS

| | | | |
|---|---|---|---|
| 4,515,840 | 5/1985 | Gatward | 428/184 |
| 4,657,610 | 4/1987 | Komatsu | 156/87 |
| 4,872,993 | 10/1989 | Tews | 156/184 |
| 4,886,696 | 12/1989 | Bainbridge | 428/184 |
| 4,954,383 | 9/1990 | King | 428/131 |
| 5,055,152 | 10/1991 | Inagaki | 156/244.11 |
| 5,089,075 | 2/1992 | Sonoda | 156/244.18 |
| 5,518,799 | 5/1996 | Finestone | 428/137 |
| 5,558,923 | 9/1996 | Vesamaa | 428/154 |

*Primary Examiner*—Jenna Davis
*Attorney, Agent, or Firm*—Donald R. Fraser

[57] ABSTRACT

A perforated laminate comprises consecutive plies of a first layer of kraft paper, a first layer of polyolefin, a layer of polyolefin fabric, a second layer of polyolefin, and a second layer of kraft paper.

24 Claims, 1 Drawing Sheet

PERFORATED LAMINATE AND PROCESS FOR PREPARING SAME

FIELD OF THE INVENTION

This invention relates generally to a perforated laminate and a process for preparing same. More particularly, the invention is directed to a perforated laminate comprising layers of kraft paper, polyolefin film, and a single layer of a polyolefin fabric; and to a process for laminating and perforating the layered structure to prepare a stock material useful for making high-strength shipping cartons, containers, packaging, and the like.

BACKGROUND OF THE INVENTION

Perforated laminates are well-known materials for making high-strength shipping cartons, containers, and other types of packaging products. Such materials conveniently can be formed into boxes, heavy-duty envelopes, packaging and shipping cylinders, and the like. Moreover, perforated laminates may be corrugated to produce even more rigid packaging products. Many perforated (and unperforated) laminate materials are easily punctured by sharp objects and degrade or disintegrate when they become wet, because they are made with paper or paperboard plies.

It would be desirable to produce a paper-based perforated laminate which is water resistant and puncture resistant, and which exhibits superior strength for making shipping cartons, containers, and other forms of packaging.

SUMMARY OF THE INVENTION

Accordant with the present invention, there surprisingly has been discovered a puncture and moisture resistant paper-based perforated laminate, and a process for preparing said laminate. The inventive perforated laminate comprises:

a first layer of kraft paper a first layer of polyolefin adhered to the first layer of kraft paper;

a layer of polyolefin fabric adhered to the first layer of polyolefin;

a second layer of polyolefin adhered to the polyolefin fabric; and a second layer of kraft paper adhered to the second layer of polyolefin;

said laminate including a multiplicity of perforations therethrough.

The invention further contemplates a process for making the perforated laminate.

The perforated laminate of the present invention is particularly useful for manufacturing shipping cartons, containers, packaging, and the like.

Further objects and advantages of this invention will be apparent from the following description and appended claims, reference being made to the accompanying drawings forming a part of the specification, wherein like reference characters designate corresponding parts in the several views.

DETAILED DESCRIPTION OF THE PREFERRED EMBODIMENTS

Figure 1:
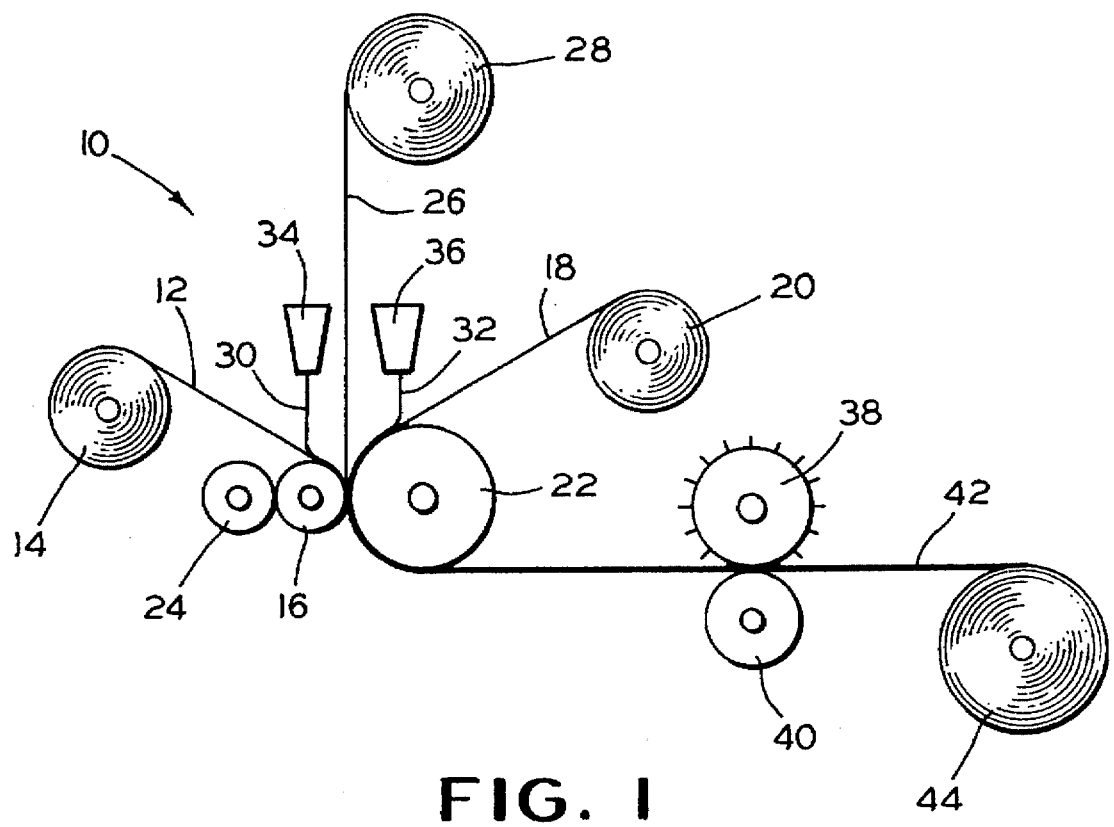
FIG. 1 is a schematic representation of a process for making the inventive perforated laminate according to the present invention, illustrating extrusion coating, laminating, and perforating operations.

Referring now to FIG. 1, there is shown generally at 10 a schematic representation of a process for making the perforated laminate according to the present invention. A web of a first layer of kraft paper 12 advances from a roll 14 and contacts the surface of a nip roll 16. At the same time, a web of a second layer of kraft paper 18 advances from a roll 20 and contacts a laminating chill roll 22. In operation, the nip roll 16 is urged toward the chill roll 22 by pressure applied to the nip roll 16 by contact with a backup roll 24. The proximity of the chill roll 22 to the nip roll 16 causes the first layer of kraft paper 12 to be positioned adjacent the second layer of kraft paper 18 at the nip.

A layer of polyolefin fabric 26 advances from a roll 28, and is inserted intermediate the first layer of kraft paper 12 and the second layer of kraft paper 18. Simultaneously, a first layer of polyolefin 30 is extrusion coated intermediate the first layer of kraft paper 12 and the layer of polyolefin fabric 26, while a second layer of polyolefin 32 is extrusion coated intermediate the second layer of kraft paper 18 and the layer of polyolefin fabric 26. The polyolefin resin for forming the first layer of polyolefin 30 is melted in a conventional extruder (not shown), extruded through a die 34 in the form of a sheet of molten resin, and deposited onto the first layer of kraft paper 12 just prior to entering the nip. The polyolefin resin used to form the second layer of polyolefin 32 is melted in a conventional extruder (not shown), extruded through a die 36 in the form of a sheet of molten resin, and deposited onto the second layer of kraft paper 18 just prior to entering the nip.

Thus, an assemblage comprising consecutively the first layer of kraft paper 12, the first layer of polyolefin 30, the layer of polyolefin fabric 26, the second layer of polyolefin 32, and the second layer of kraft paper 18 enters the nip between the nip roll 16 and chill roll 22, thereby laminating the assemblage. The resultant laminate is prated from the chill roll 22 and passed through a conventional needle punch comprising a punch roll 38 and a punch backup roll 40. The resultant perforated laminate 42 thereafter is accumulated onto a take-up roll 44.

Figure 2:
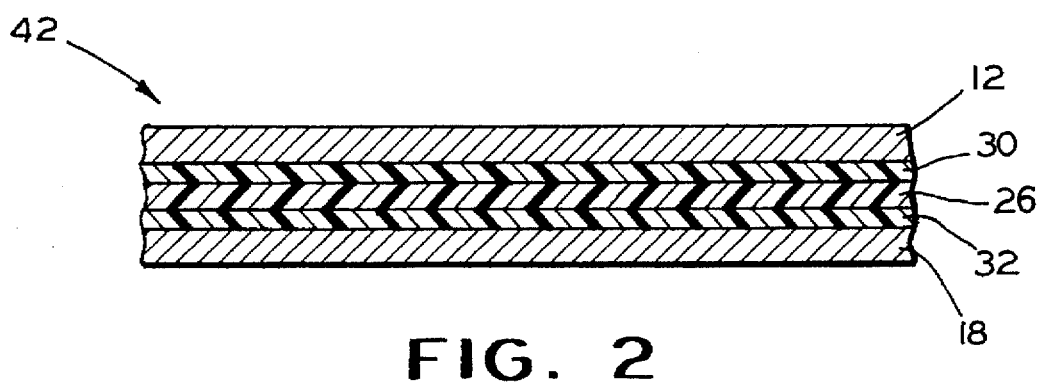
FIG. 2 is a schematic cross-sectional view of a laminate according to the present invention.

FIG. 2 illustrates the laminated assemblage prepared by the process 10 of FIG. 1, comprising the first layer of kraft paper 12, the first layer of polyolefin 30 adhered to the first layer of kraft paper 12, the layer of polyolefin fabric 26 adhered to the first layer of polyolefin 30, the second layer of polyolefin 32 adhered to the layer of polyolefin fabric 26, and the second layer of kraft paper 18 adhered to the second layer of polyolefin 32.

The kraft paper suitable for use in preparing the first and second layers of kraft paper according to the present invention is well-known in the art of manufacturing laminated articles. The kraft paper may contain conventional paper adjuvants such as, for example, strength-increasing agents, sizing agents, dyes, preservatives, fillers, antistatic agents, clays, Kaolin, talc, barium sulfate, calcium carbonate, titanium dioxide, zinc oxide, and the like. The thickness of the kraft paper may vary over wide limits from about 2 mils to about 50 mils. Preferably, the range is from about 3 to about 12 mils. The kraft paper may be a virgin or recycled product, and the first and second layers of kraft paper may be the same or different in composition and/or thickness.

Polyolefin fabrics suitable for use according to the present invention comprise a polyolefin film including a multiplicity of reinforcing fibers. Examples of polyolefin materials useful for preparing the polyolefin fabric include, but are not necessarily limited to, high, medium, and low density polyethylene, polypropylene, polybutylene, and the like, as well as blends and copolymers thereof. A preferred polyolefin comprises high density polyethylene. The reinforcing filaments may comprise conventional materials such as, for example, glass or metal fibers, or polymeric fibers made from polyolefins, polyesters, acrylics, polycarbonates, and the like, as well as blends and copolymers thereof. The reinforcing filaments may be present in the fabric in a concentration from about 4.5×2.5 to about 12×4 tape count per inch, and may have a Denier ranging from about 100° to about 3000°. The polyolefin fabric may be either woven or non-woven. A preferred polyolefin fabric may be obtained from Fabrene, Inc. of North Bay, Ontario, Canada under the product designation "FABRENE ATA."

Resins suitable for extrusion coating the first and second layers of polyolefin according to the present invention include but are not necessarily limited to, low, medium, and high density polyethylene, polypropylene, polybutylene, and the like, as well as blends and copolymers thereof. A preferred polyolefin comprises linear low density polyethylene. The thickness of each of the layers of polyolefin may range over wide limits from about 0.215 to about 400 mils. Preferably, the thickness ranges from about 0.5 to about 4 mils. A preferred low density polyethylene may be obtained from Eastman Chemical of Kingsport, Tenn. under the product designation "EASTMAN 808P." The first and second layers of polyolefin may be the same or different in composition and/or thickness.

The nip roll is typically a rubber or rubber-covered roll having a Durometer hardness from about 50 to about 75. The backup roll urges the nip roll toward the chill roll. The pressure between the nip roll and chill roll generally ranges from about 10 pounds per linear inch to about 200 pounds per linear inch. Preferably, the pressure is from about 50 to about 150 pounds per linear inch. A most preferred process utilizes a rubber nip roll having a Durometer hardness of about 60, which contacts the chill roll at a pressure of from about 80 to about 100 pounds per linear inch.

The chill roll generally has a smooth surface, and is chrome-plated to prevent its deterioration. The chill roll may be cooled by any conventional technique, such as, for example, by passing a cooling medium, e.g., water, through the interior thereof. The temperature of the chill roll is conveniently maintained from about 55° F. to about 150° F. during the laminating operation.

The polyolefin resin may be melted in any conventional extrusion apparatus generally known in the art, and discharged from each die to form falling sheets of molten resin. The resin is extruded so as to form layers of molten resin which then cool to form the first and second layers of polyolefin in the final product. At each of the extrusion dies, the temperature of the resin generally is maintained at from about 400° F. to about 700° F., depending upon the type of resin used and the thickness of the resultant layer of polyolefin desired. Preferably, the extrusion temperature ranges from about 580° F. to about 625° F.

In operation, the first and second layers of kraft paper and the layer of polyolefin fabric advance at the same speed, between about 50 feet per minute and about 500 feet per minute, into the nip. Immediately prior to entering the nip, the first and second layers of polyolefin are extruded between the first layer of kraft paper and the polyolefin fabric and between the second layer of kraft paper and the polyolefin fabric, respectively.

As each of the layers enters the nip, they are pressed together and laminated. The molten polyolefin resin layers solidify and bond to the layers on either side. As the laminated assemblage exits the nip, the polyolefin layers solidify by the transfer of heat energy to the chill roll. At a subsequent position on the circumference of the chill roll, the laminated assemblage is parted therefrom and transported to a conventional device for perforating the laminate, such as a needle punch. Conveniently, the laminated assemblage may be perforated by passing it between the rotating punch role and corresponding punch backup roll. This effectively places a multiplicity of small apertures in the laminate. Such apertures may range in size from about 0.2 mil to about one-quarter inch. The shapes, numbers, and arrangement of these apertures may vary over wide limits depending upon the desired use for the perforated laminate, and are not sharply critical to the practice of the present invention.

It must be noted that the process conditions are not sharply critical for the successful practice of the present invention. The process conditions described hereinabove are generally disclosed in terms which are conventional in the art to the practice of the invention. Occasionally, however, the process conditions as described may not be precisely applicable for each compound or material included within the disclosed scope. Those compounds and materials for which this occurs will be readily recognizable by those ordinarily skilled in the art. In all such cases, either the process may be successfully performed by conventional modifications known to those ordinarily skilled in the art, e.g., by increasing or decreasing the extrusion temperatures or web speeds, by varying the thicknesses of the various layers, by routine modifications of the lamination pressure or nip roll hardness, etc., or other process conditions which are otherwise conventional will be applicable to the practice of the invention.

From the foregoing description, one ordinarily skilled in the art can easily ascertain the essential characteristics of this invention and, without departing from its spirit and scope, can make various changes and modifications to adapt the invention to various usages and conditions.

In accordance with the provisions of the patent statutes, the present invention has been described in what is considered to represent its preferred embodiment. However, it should be understood that the invention can be practiced otherwise than as specifically illustrated and described without departing from its spirit or scope.

What is claimed is:

1. A perforated laminate, comprising:
    a first layer of kraft paper;
    a first layer of polyolefin adhered to the first layer of kraft paper;
    a layer of polyolefin fabric adhered to the first layer of polyolefin;
    a second layer of polyolefin adhered to the polyolefin fabric; and
    a second layer of kraft paper adhered to the second layer of polyolefin;
    said laminate including a multiplicity of perforations therethrough.

2. The perforated laminate according to claim 1, wherein the first and second layers of kraft paper each has a thickness from about 2 to about 50 mils.

3. The perforated laminate according to claim 1, wherein the first and second layers of kraft paper each has a thickness from about 3.0 to about 12 mils.

4. The perforated laminate according to claim 1, wherein the first and second layers of kraft paper are the same.

5. The perforated laminate according to claim 1, wherein the first and second layers of kraft paper are different.

6. The perforated laminate according to claim 1, wherein the first and second layers of polyolefin each is selected from the group consisting of low, medium, and high density polyethylene, polypropylene, polybutylene, and blends and copolymers thereof.

7. The perforated laminate according to claim 1, wherein the first and second layers of polyolefin are low density polyethylene.

8. The perforated laminate according to claim 1, wherein the first and second layers of polyolefin each has a thickness from about 0.25 to about 400 mils.

9. The perforated laminate according to claim 1, wherein the first and second layers of polyolefin each has a thickness from about 0.5 to about 4 mils.

10. The perforated laminate according to claim 1, wherein the first and second layers of polyolefin are the same.

11. The perforated laminate according to claim 1, wherein the first and second layers of polyolefin are different.

12. The perforated laminate according to claim 1, wherein the layer of polyolefin fabric comprises a polyolefin selected from the group consisting of high, medium, and low density polyethylene, polypropylene, polybutylene, and blends and copolymers thereof.

13. The perforated laminate according to claim 1, wherein the layer of polyolefin fabric comprises high density polyethylene.

14. The perforated laminate according to claim 1, wherein the polyolefin fabric comprises fibers selected from the group consisting of glass, metal, and polymeric fibers.

15. The perforated laminate according to claim 1, wherein the polyolefin fabric comprises reinforcing filaments having a concentration from about 4.5×2.5 to about 12×4 tape count per inch.

16. The perforated laminate according to claim 1, wherein the polyolefin fabric comprises fibers having a Denier ranging from about 100 to about 3000.

17. The perforated laminate according to claim 1, wherein the apertures are from about 0.2 mil to about one-quarter inch in size.

18. A process for preparing a perforated laminate, comprising the steps of:
providing a first layer of kraft paper;
providing a second layer of kraft paper adjacent the first layer of kraft paper;
inserting a layer of polyolefin fabric intermediate the first and second layers of kraft paper;
extrusion coating a first layer of polyolefin intermediate the first layer of kraft paper and the polyolefin fabric;
extrusion coating a second layer of polyolefin intermediate the second layer of kraft paper and the polyolefin fabric;
laminating together the first layer of kraft paper, the first layer of polyolefin, the layer of polyolefin fabric, the second layer of polyolefin, and the second layer of kraft paper to form a laminate; and
perforating the laminate.

19. The process for preparing a perforated laminate according to claim 18, wherein the first and second layers of kraft paper are provided at a rate of from about 50 to about 500 feet per minute.

20. The process for preparing a perforated laminate according to claim 18, wherein the polyolefin resins are extruded at temperatures from about 400° F. to about 700° F.

21. The process for preparing a perforated laminate according to claim 18, wherein the polyolefin resins are extruded at temperatures from about 580° F. to about 625° F.

22. The process for preparing a perforated laminate according to claim 18, wherein the layers are laminated at a pressure from about 10 to about 200 pounds per linear inch.

23. The process for preparing a perforated laminate according to claim 18, wherein the layers are laminated at a pressure from about 50 to about 150 pounds per linear inch.

24. The process for preparing a perforated laminate according to claim 18, wherein the laminating step utilizes a chill roll maintained at a temperature from about 55° F. to about 150° F.

* * * * *